United States Patent [19]
St. John

[11] Patent Number: 5,131,982
[45] Date of Patent: Jul. 21, 1992

[54] USE OF DADMAC CONTAINING POLYMERS FOR COATED BROKE TREATMENT

[75] Inventor: Michael R. St. John, Chicago, Ill.

[73] Assignee: Nalco Chemical Company, Naperville, Ill.

[21] Appl. No.: 485,026

[22] Filed: Feb. 26, 1990

[51] Int. Cl.$^5$ ............................................. D21H 17/45
[52] U.S. Cl. .............................. 162/168.2; 162/168.3; 162/191; 162/199; 162/DIG. 4
[58] Field of Search ................. 162/5, 147, 168.2, 189, 162/191, 199, DIG. 4, 168.3

[56] References Cited

U.S. PATENT DOCUMENTS

| 4,029,885 | 6/1977 | Buikema . | |
|---|---|---|---|
| 4,268,352 | 5/1981 | Cosper et al. . | |
| 4,964,955 | 10/1990 | Lamar et al. | 162/199 |

FOREIGN PATENT DOCUMENTS

| 0172684 | 7/1985 | European Pat. Off. | 162/5 |
|---|---|---|---|
| 8906294 | 7/1989 | World Int. Prop. O. | 162/DIG. 4 |

OTHER PUBLICATIONS

Chris Bennett: "Recycling of Fibres and Fillers in the Pulp and Paper Industry" EU-CE-PA/DITP Symposium Ljublajan; 1989, pp. 176-178.
R. W. Hagemeyer: "Pigment Coating"; *Pulp and Paper Chemistry and Chemical Technology;* 3rd ed.; vol. VI; J. P. Casey, ed.; 1983, pp. 2013-2094.
*Pulp and Paper Chemistry and Chemical Technology;* 3rd ed.; vol. II; J. P. Casey, ed.; 1980, pp. 825-826.
Karen Edwards: "Wet End Chemical Control Reduces Recycled Coated Stock Problems" *Pulp & Paper*, vol. 52 (Feb. 1987), pp. 52-54.

*Primary Examiner*—Peter Chin
*Attorney, Agent, or Firm*—Robert A. Miller; Peter J. Georges

[57] ABSTRACT

DADMAC containing polymers, both homopolymers and copolymers are used in effective coagulating amounts to treat cellulosic fibres recycled from coated broke recovery. The DADMAC containing polymers are either homopolymers or are preferably copolymers containing acrylamide. Recycle of coated broke can cause difficulties when the fibres are recycled to the paper manufacturing process because the coatings contain binders which cause what is referred to as "white pitch", the accumulation of which can cause holes in the paper, build-up of residues and sticky masses, and clogging of felts and the like in the manufacture of paper. The use of the DADMAC polymers eliminates this difficulty in making paper from recycled cellulose fibres ottained from coated broke recycle.

15 Claims, 11 Drawing Sheets

USE OF DADMAC CONTAINING POLYMERS FOR COATED BROKE TREATMENT

INTRODUCTION

Paper Broke is a term used by paper makers to describe that paper which they cannot or do not sell because it does not meet specifications for some of many reasons. This paper is a valuable source of fibre and is recycled internally at the mill although it may also be sold to other mills as a source of fibre. This paper broke frequently contains coatings that are applied to the base sheet of paper as it is being manufactured. When the paper broke contains these coatings, it is referred to as a coated broke, and presents special problems in recycling to recover fibre values because the coatings introduce materials which would not normally be present in the original stock of fibre used to manufacture the base paper sheet.

The coating materials contained on a coated broke may account for from about ten (10) to about forty (40) weight percent of the total solids in the paper finish. The major components of the coatings normally contained on a coated broke consist of various pigments and binders. Of the total coating contained on a coated broke, the pigments normally constitute from about eighty (80) to ninety-five (95) percent of the coating mass, and the binders are contained on the coating from about five (5) to about twenty (20) weight percent of the coating mass.

The pigments normally are composed of typical pigments and fillers used in the manufacture of paper, which pigments and fillers can include clays of various types, calcium carbonate, titanium dioxide, and other similar or specialty pigments and fillers.

The binders used are frequently those binders obtained from normal latex polymers such as those derived from styrene-butadiene resins, polyvinyl acetate resins, polyvinyl alcohol resins, and polyacrylic or polyacrylate resins. Certain binders can be customized depending upon the end result desired by the paper maker.

The combination of these binder materials, which can also include certain natural products such as starches and dextrans, with the pigments and fillers earlier mentioned, all of which are contained as part of the coating in a coated broke presents certain problems when the coated broke is recycled to recover fibre values.

The most difficult problem involved with recycling coated brokes is derived from the binder materials, sometimes in combination with pigments or fillers, since these polymers and the materials to which they have been attached, are the origin of sticky deposits. These sticky deposits, referred to as "white pitch", cause difficulties when recycled back to the paper machine operation. In addition to these white pitch sticky deposits, problems that are caused can include, but are not necessarily limited to, those problems associated often with the standard pitch derived from natural wood fibres. The problems caused by inclusion of this white pitch in the paper making processes using recycled coated brokes can include offspeck paper caused by holes and/or deposits of the white pitch, machine down time resulting from sheet breaks or more frequent machine cleanup, clogging of the felts used in the manufacture of the base sheet, and the like.

It is, therefore, a purpose of my invention to improve the use of coated brokes by treating the white pitch problem in a way that the components of white pitch are attached to the fibres of the coated broke after they have been re-pulped, thereby eliminating the opportunity for white pitch deposits to generate in the paper making process.

Another object of this invention is to add to a process for re-pulping coated broke effective amounts of a coagulant polymer so as to coagulate the components of white pitch, particularly the components of the binders contained in the coating of a coated broke, on the re-pulped fibres in the re-pulper process prior to those fibres being blended in a blend chest with other fibre sources immediately before sheet formation in the paper making process.

Another object of the invention is to choose a preferred copolymer containing the monomer DADMAC as the most preferred coagulant polymer by which white pitch and its components are coagulated onto re-pulped coated broke fibres, thereby eliminating the accumulation of white pitch in downstream operations, including those operations using this recycled pulp source in the process of making paper.

Another object of the invention is to choose as the most preferred coagulant polymer for treatment of white pitch and its components a copolymer of DADMAC and acrylamide (abbreviated AcAm) monomers.

PRIOR BROKE TREATMENT

Figure 1:
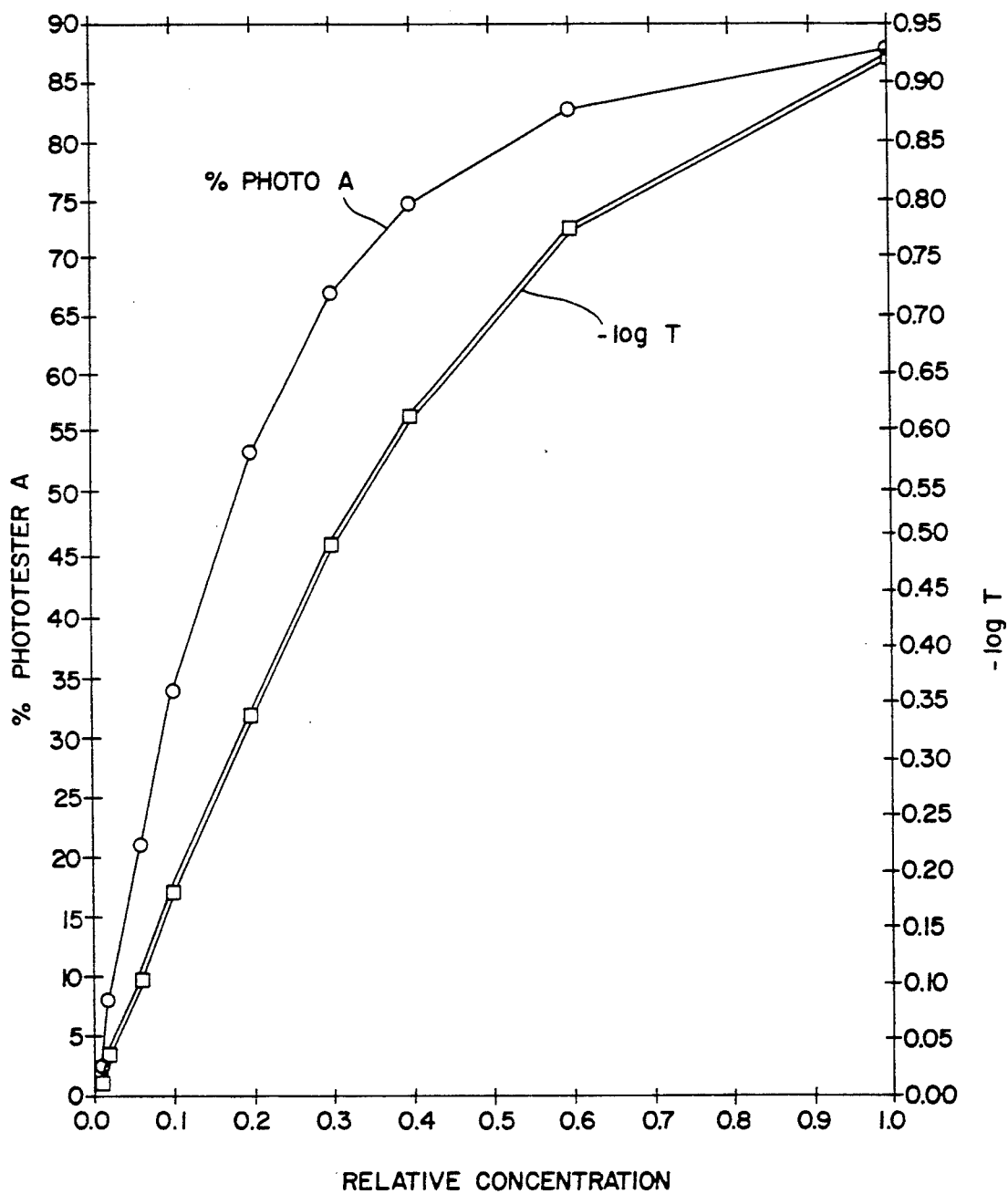
FIG. 1 is a graph presenting data obtained by phototester measurements of suspended solids in T-broke #1 filtrate.

In the past polymers derived from cross-linked or linear epichlorohydrin/dimethyl amine (EPI-DMA) reactants have been used to treat coated broke. These materials, though effective in certain coated broke applications, have difficulties of their own primarily derived from the fact that the materials may be cross-linked and can form gel particles which provide their own difficulties in further processing of the paper sheet. In addition, although this EPI-DMA material is highly cationically charged, as originally considered necessary for this type of application, it has been found that this very high cationic charge density is not necessary for effective treatment of coated broke and the white pitch derived therefrom. Finally, there seems to be a potential environmental threat developing in terms of any materials containing epichlorohydrin, particularly if those materials can be broken down into epichlorohydrin monomer or contain residual epichlorohydrin monomers since this monomeric material is a known toxin.

THE INVENTION

I have discovered a method for treating recycled coated broke through a pulper which re-pulps this coated broke residue paper for use in recycling the cellulose fibres to the paper machine. My improved method of recycling coated broke comprises adding to the re-pulped coated broke slurry, after the pulper, an effective amount for the purpose of coagulating white pitch of a polymer containing the monomer DADMAC, that is diallyl dimethyl ammonium chloride.

This invention also includes a method for improving the manufacture of base paper sheet using cellulose fibre obtained by re-pulping coated broke, which method comprises treating a re-pulped fibre slurry obtained by pulping with an effective coagulating amount of a polymer containing at least 20 weight percent of the monomer diallyl dimethyl ammonium chloride, admixing to obtain coagulating white pitch on the re-pulp fibre to obtain a coagulated re-pulp fibre slurry, and then admixing the coagulated re-pulp fibre slurry with other fibre sources prior to formation of a base paper sheet.

The invention similarly involves a method of enhancing the quality of cellulosic fibres obtained from re-pulped coated broke comprising beating and re-pulping coated broke in an aqueous slurry, adding to said slurry an effective white pitch coagulating amount of a polymer containing at least 20 weight percent of the monomer diallyl dimethyl ammonium chloride, said polymer having a weight average molecular weight of from abut 50,000 to about 2,000,000, then admixing the slurry with the polymer for a time sufficient to form an enhanced coated broke fibre slurry for use in the manufacture of base paper sheet.

The invention includes, in addition, a method of treating re-pulped coated broke fibres and slurries containing said fibres, thereby coagulating white pitch and any of its binder components onto said fibres, which method comprises treating an aqueous slurry of re-pulped coated broke with an effective coagulating amount of a copolymer of diallyl dimethyl ammonium chloride and acrylamide, wherein said copolymer contains a weight ratio of DADMAC to acrylamide between about 4:1 to about 1:4 and has a weight average molecular weight ranging between about 100,000 to about 1,500,000.

THE DADMAC POLYMERS

The polymer(s) used, hereinafter referred to as the DADMAC polymer(s), can be homopolymers of DADMAC or copolymers of DADMAC. The copolymers can contain DADMAC at weight ratios relative to other vinylic monomers ranging from about 4:1 to about 1:4. Preferably the polymers of my invention are homopolymers containing DADMAC or copolymers of DADMAC and acrylamide which contain DADMAC and acrylamide monomers in weight ratios of about 3:1 to about 1:3, and preferably the DADMAC-acrylamide polymer contains a 2:1 to 1:2 weight ratio of DADMAC monomer to acrylamide monomer, and most preferably the DADMAC:acrylamide monomer weight ratio is about 60:40 to about 40:60.

This DADMAC homopolymer or DADMAC-acrylamide polymer can have a molecular weight ranging from about 25,000 up to about 2,500,000, which molecular weight is a weight average molecular weight, but preferably the polymers have a molecular weight ranging between about 50,000 to about 2,000,000. Most preferably the polymers used have molecular weights ranging between about 75,000 to about 1,500,000.

These DADMAC homopolymers or DADMAC-acrylamide copolymers are added after the pulper in a broke fibre recycle stream and prior to any holding chest or storage vessel, or preferably these polymers may be added after the re-pulped coated broke slurry has been retained in a holding chest and before or during the time this coated broke fibre slurry is being pumped to a blend chest for the purpose of blending this coated broke fibre source with other fibre sources such as from raw wood fibres prior to use in making base paper sheet. The addition of the preferred DADMAC homopolymers or DADMAC-acrylamide copolymers preferably is after the holding chest in a broke recycle process used to re-pulp coated broke forming a broke fibre slurry and prior to the blending of this re-pulped coated broke fibre slurry with the other fibre sources in the blend chest used to store paper fibre 1 slurries prior to use in the manufacture of paper sheet.

POLYMER TREATMENT LEVELS

The amount of polymer which has been found effective for coagulating white pitch and its components, the pigments and binders described above, ranges from a concentration of approximately 0.20 pounds active polymer per ton of total broke solids up to and including about 10 pounds active polymer per ton of total broke solids.

Preferably, treatment levels range between about 0.50 pounds polymer per ton total broke solids to about 5.0 pounds per ton. Most preferably, the effective treatment ranges are between about 0.75 pounds per ton to about 3.5 pounds per ton, although each source of coated broke can and does have its own character and the treatment level demand for our polymers to treat white pitch does vary with the source of coated broke fibres.

It is believed , although the invention should not be limited to these theories, that this improvement in treating coated broke to recover its fibre content is achieved because of the use in the polymer backbone of the unique monomer diallyl dimethyl ammonium chloride, either by itself or with other vinylic monomers, preferably with acrylamide.

It is further believed that the DADMAC monomer, having no ability to hydrogen bond, and containing higher oleophilic character than its comonomer acrylamide, provides for a means to attach and attach to the coated broke cellulosic fibres, the various binder molecules and pigments contained in the coatings, as described above, in a way so as to prevent accumulation of these binder polymers and pigments into what is referred to as white pitch. It is also believed that the coagulation of the white pitch binders onto the fibre itself not only prevents accumulation of white pitch, but also provides a fibre which can contain, attached to its surfaces, some pigment or filler content as well as binder content, which content assists in the manufacture of base paper sheet.

In addition to the normal DADMAC or DADMAC-acrylamide polymers, some variations in polymer structure are expected, at various efficiencies, to also function in the recovery of white-pitch free fibre values from coated brokes. These variations may include, in addition to the molecular weights and various weight ratios of DADMAC and acrylamide as described above, the addition of other neutral, cationic or anionic monomers such as methacrylamide, acrylic acid, methacrylic acid, other diallyl dialkyl ammonium chloride monomers, and various other monomers such as hydroxypropyl acrylamide, N-t-butyl acrylamide, along with the numerous structural variations thereof. Also, cationic vinylic monomers known in the art, such as dimethylaminoethyl acrylate, dimethylaminoethyl acrylate methyl chloride quaternary salt, dimethylaminoethyl acrylamide, dimethylaminoethyl acrylamide methyl chloride quaternary salt, and the like should be useful when combined with DADMAC, with or without other monomers.

In addition, blends of other cationic or neutral polymeric materials with our DADMAC polymers would be expected to be efficiently used in the white pitch-free recycle of coated broke fibre values. Such blends may contain homopolymers or copolymers of acrylamide, where the copolymers are made with at least one of the monomers chosen from the group consisting of acrylic acid, methacrylic acid, methacrylamide, vinyl cationic monomers such as those cited above, hydroxypropyl acrylamide, hydroxypropyl acrylic acid, hydroxypropyl methacrylate, methyl and ethyl acrylate, and the like.

In the use of our preferred DADMAC-acrylamide polymers to treat coated broke to recover fibre values for recycle to the paper making process, it is reasonable to test various kinds of polymers through the treatment range taught above. The polymers can be homopolymer of DADMAC or copolymers of DADMAC and acrylamide which contain as little as 20-25 weight percent DADMAC and as much as 75-80 weight percent acrylamide, or they may contain as much as 75-80 weight percent DADMAC and as little as 20-25 weight percent acrylamide. It is most preferred, in most uses of the copolymers, that the DADMAC-acrylamide polymer contain between about a 60:40 to about a 40:60 weight ratio of DADMAC and acrylamide.

To provide further insight into the invention which uses our DADMAC based polymers to recover cellulosic fibres from coated broke re-pulping and recycle, the following examples, tables, and figures are presented.

A simple filtrate turbidity test was used to evaluate coagulant activity. This measures the ability of the test coagulant polymer to retain coated broke materials during vacuum filtration through a coarse filter paper. The test conditions used in the presentation of this information are given in Table I.

TABLE I

| Filter Turbidity Test Conditions | |
|---|---|
| Sample Size | 200 ml coated broke (various sources) |
| Mixing Speed | 500 rpms with Britt jar propeller in 400 ml beaker |
| Mixing Sequence | t = 0         start mixer |
|  | t = 10 seconds    add coagulant |
|  | t = 30 seconds    stop mixing |
| Polymer Concentration | Dosed as 0.3 to 0.5 weight percent as polymer |
| Filtration | 9 cm Buchner funnel and 500 ml filter flask with coarse Filpaco filter paper; sample filtered to completion |
| Test | Phototester Turbidity of 10 to 20 mls filtrate diluted to 50 ml with DI water determined |

The Filpaco coarse filter paper as used in Table I is not characterized, but it is very coarse. Variations of mixing speeds were also tested.

Using our test procedures, the majority of pigment materials readily passed through the filter such that turbidities of undiluted filtrates were always too high to be measured directly by our techniques. As a result, a dilution ranging from one or two up to five with deionized water was generally required to bring the turbidity into an acceptable range for measurement by the phototester used in these experiments. Because filtration is improved by the filter cake formed on the filter paper, the turbidity of the filtrate is therefore a function of time during the filtration test. Therefore, the samples were filtered to completion, the filtrate collected and measured, thereby preventing any such time dependence based upon filter cake formed during the filtration test.

A standard phototester was used to measure filtrate turbidity which was taken to be proportional to the concentration of suspended solids. The so called "absorbance" of the phototester does not correspond to any accepted meaningful quantity and is not directly proportional to turbidity, but is a measure of the quantity of suspended solids in the filtrate. Percent Photo A, which is the phototester absorbance reading, is related to the percent transmittance of the instrument by the following simple equation, percent Photo A = 100% − %T.

The percent transmittance (%T) is defined in the normal way as the transmitted light intensity through a particular measuring cell divided by the incidence light intensity. In the absence of absorption and under ideal condition, the transmittance is related to the turbidity exponentially by the formula, $$\frac{I_t}{I_o} = \exp(-\tau l)$$

where $l$ is the path length of the cell through which the measurement is taken, and $\tau$ is the turbidity.

After manipulating these various relationships, one can determine that $-\tau l$ is equal to A, where A is the absorbance reading.

FIG. I provides the relationships between both % Photo A and log T with solids concentrations determined by dilution. The relation between log T or true absorbance A and concentration is much more linear than the relationship to the % Photo A response, however significant deviations from linearity exist primarily at high concentrations even for log T. This would appear to emphasize that this deviation is expected when multiple scattering becomes significant and would occur at high suspended solids concentration.

Although the curves demonstrated in FIG. I are different, they vary qualitatively in the same manner, that is when one increases or decreases, so does the other. As a result, comparison of relative efficiencies of polymers, i.e. doses required to attain a fixed performance level, is found to be nearly identical irrespective of the base curve used. It is therefore simple to calculate replacement ratios using the dosage curves obtained by measuring % Photo A, since they are nearly the same as those using the correct log T values. Because little error is believed to be introduced, other than some deviations found at very low values of % Photo A, the % Photo A result was used directly to evaluate the data presented herein.

Using this procedure, a matched pair of phototester tubes were identified and one used for a blank while the other was used for the test samples. These cells were aligned in the phototester the same way for each test and the same pair of cells were used throughout the testing. Data was evaluated by plotting curves of percent turbidity reduction versus polymer dosages, and the percent turbidity reduction is defined as follows:

$$\% \text{ Turbidity Reduction} = \frac{\% \text{ Photo } A \text{ of Untreated Broke Filtrate} - \% \text{ Photo } A \text{ of Treated Broke Filtrate}}{\% \text{ Photo } A \text{ of Untreated Broke Filtrate}} \times 100\%$$

This method of presenting data emphasizes the amount of retention rather than the turbidity of the water attainable. Replacement ratios were measured on the basis of the above techniques. The use of replacement ratios indicates that polymers are being evaluated on an efficiency basis measured by the amount of polymer required to achieve a given performance level versus a standard material. The results of the above tests are given below.

Initial testing was performed on a paper manufacturing site in a process using coated broke recycle processes. The processes included collection of the coated broke, i.e. paper production discard, chopping and feeding this coated broke discard to a re-pulper (beater) and pulping the coated broke in aqueous media to form a broke fibre slurry, and then pumping this aqueous slurry to a holding chest (or holding tank) equipment to be mixed. From this holding chest or tank the fibre slurry is pumped to a blend chest where this coated broke fibre source is blended with other fibre sources prior to manufacture of a base paper sheet.

Samples of the re-pulped coated broke was taken from the holding chest prior to its being pumped to the blend chest as described above. These materials were then exposed to the test procedures above, in the presence of various treating agents, and the results are presented in the following tables and figures.

FIGS. 1 through 11 are separately labelled and are explained below. Table containing calculated replacement ratios from the data presented in the Figures are presented below.

Referring to FIG. 1, Phototester A and −Log of transmittance are presented as a function of relative concentration for filtrate from the filtrate turbidity test of T-broke #1. T-broke #1 is from a state in the Eastern United States.

Figure 2:
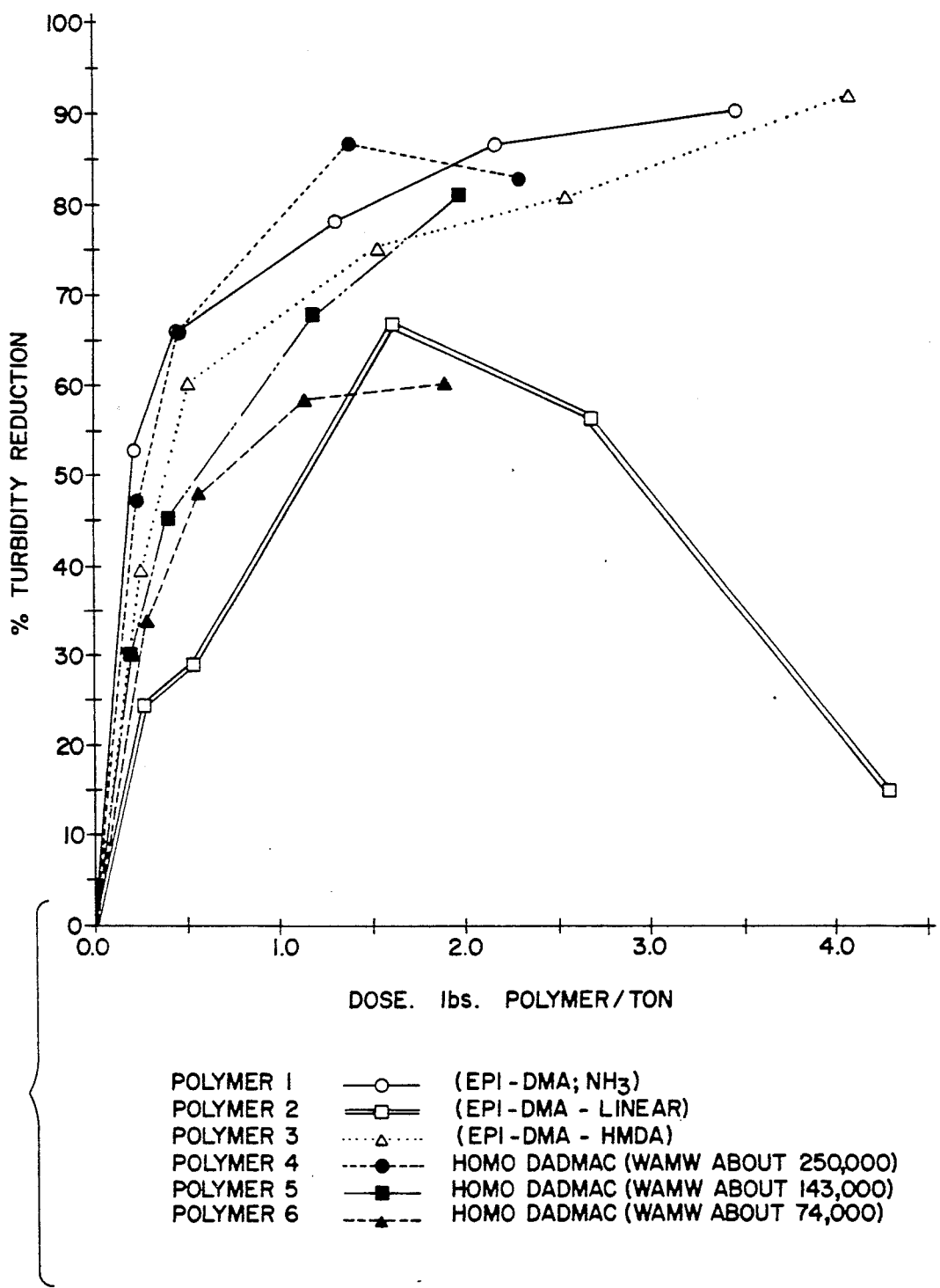
FIG. 2 is a graph comparing p-DADMAC and EPI/DMA polymer activities for filtrate turbidity reduction in C-broke #1 at varying levels of polymer dose.

Referring to FIG. 2, a comparison of p-DADMAC and EPI/DMA polymer activities for filtrate turbidity reduction in C-broke #1 is shown. C-broke #1 is from a state in the North Central United States.

TABLE II (Supplement to FIG. 2)

| Performance Level, % Turbidity Reduction | Replacement Ratios | | | | | |
|---|---|---|---|---|---|---|
| | Polymer 1 | Polymer 2 | Polymer 3 | Polymer 4 | Polymer 5 | Polymer 6 |
| 50 | 1.00 | 5.50 | 1.86 | 1.29 | 2.71 | 3.26 |
| 65 | 1.00 | 3.73 | 1.97 | 1.07 | 2.59 | NA |
| 80 | 1.00 | NA | 1.56 | 0.72 | 1.27 | NA |

NA = Performance Level is Not Attainable

Figure 3:
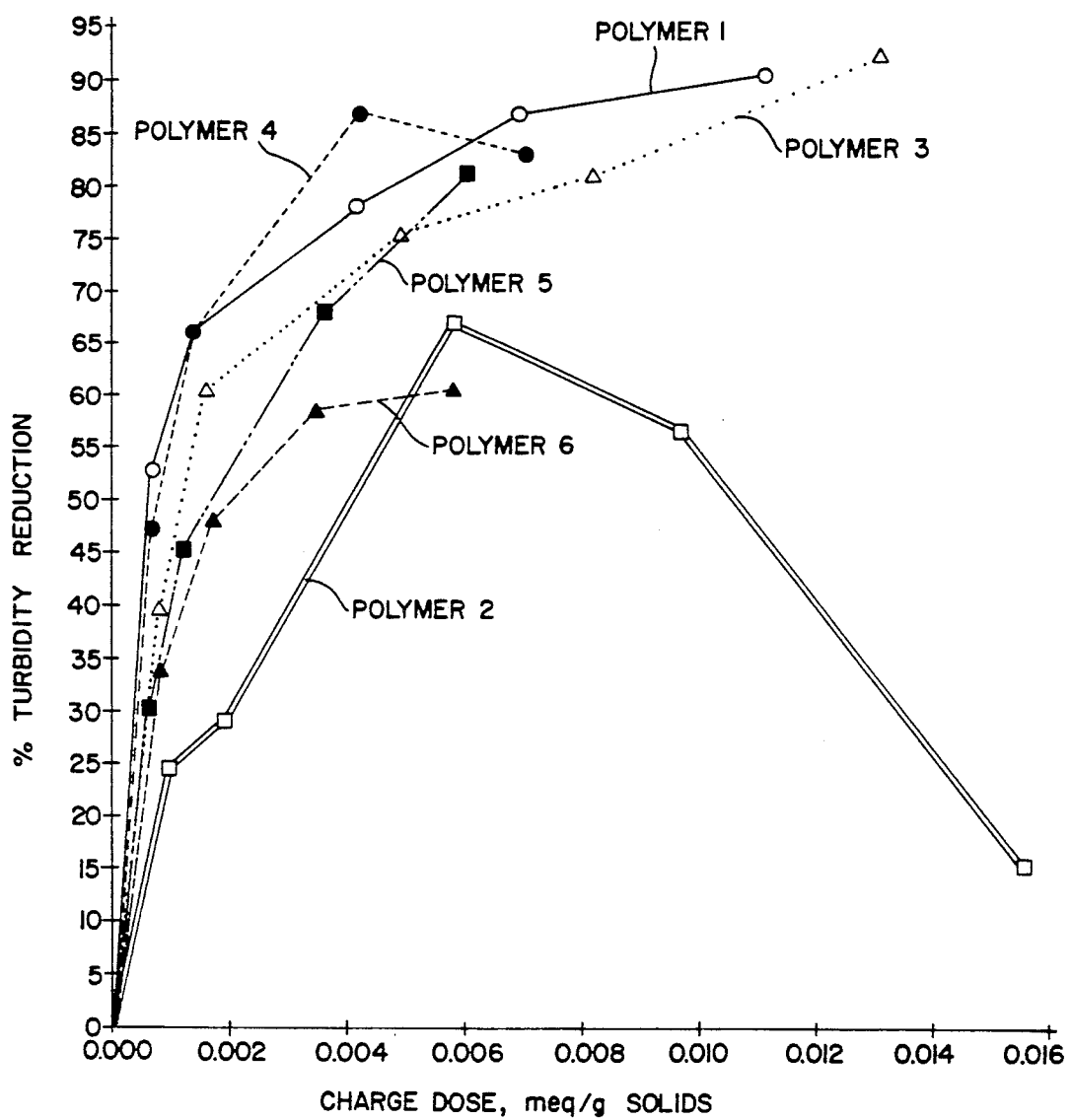
FIG. 3 is a graph comparing p-DADMAC and EPI/DMA polymer activities for filtrate turbidity reduction in C-broke #1 at varying levels of cationic dose.

Referring to FIG. 3, a comparison of p-DADMAC and EPI/DMA charge dose activities for filtrate turbidity reduction in C-broke #1 is shown. C-broke #1 is from a state in the North Central United States.

Figure 4:
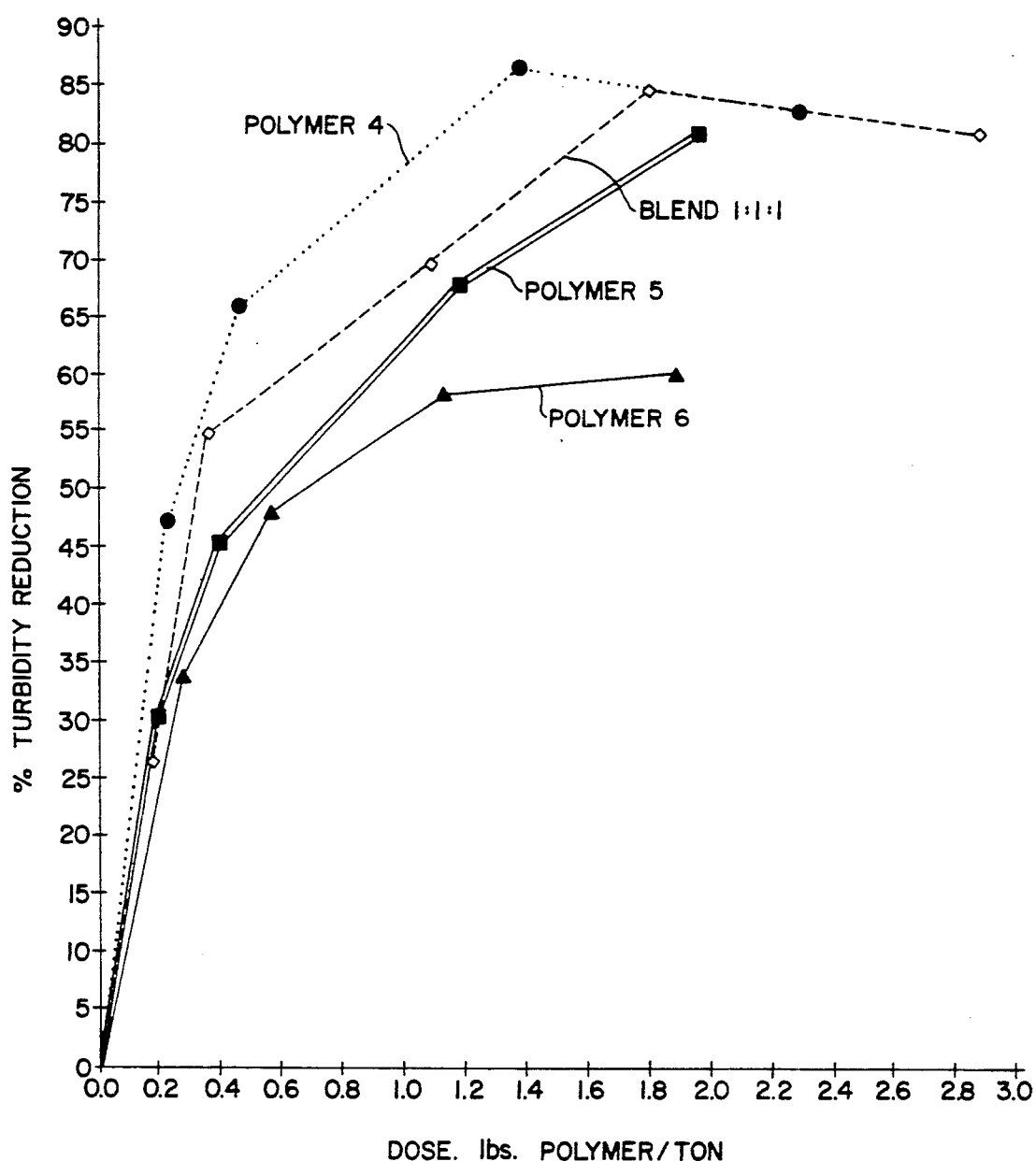
FIG. 4 is a graph comparing p-DADMAC polymer activities with their blend activities for filtrate turbidity reduction in C-broke #1 at varying levels of polymer dose.

Referring to FIG. 4, a comparison of p-DADMAC polymer activities with their blend for filtrate turbidity reduction in C-broke #1 is shown. C-broke #1 is from a state in the North Central United States.

Figure 5:
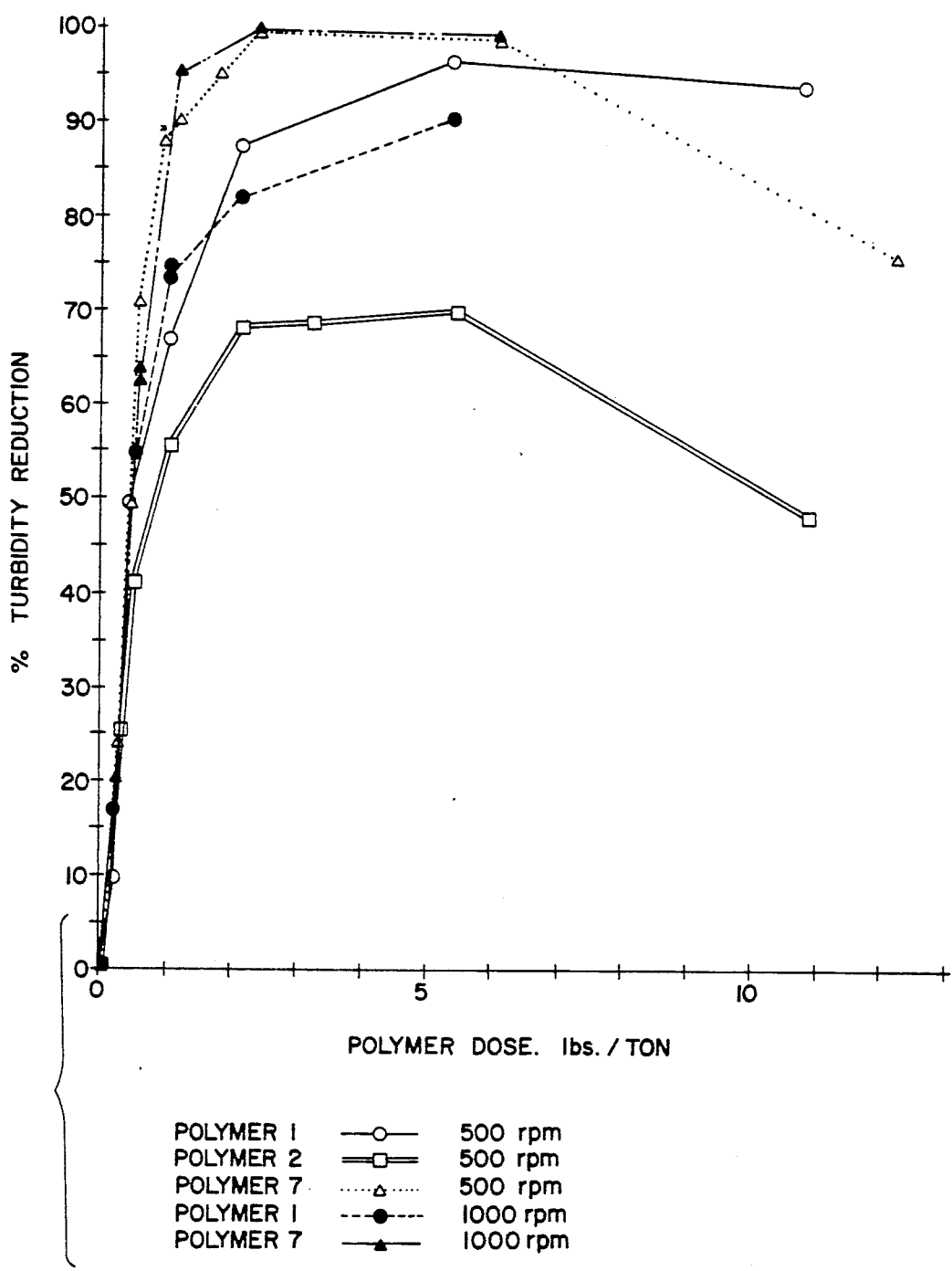
FIG. 5 is a graph comparing EPI/DMA polymer and Polymer 7 activities for filtrate turbidity reduction in C-broke #2 at different shear rates.

Referring to FIG. 5, a comparison of polymer 7 activity with EPI/DMA polymers for filtrate turbidity reduction in C-broke #2 at different shear rates is shown.

TABLE III (Supplement to FIG. 5)

| Performance Level, % Turbidity Reduction | Replacement Ratios | | | | |
|---|---|---|---|---|---|
| | Polymer 1 500 rpm | Polymer 1 1000 rpm | Polymer 7 500 rpm | Polymer 7 1000 rpm | Polymer 2 500 rpm |
| 50 | 1.00 | 1.10 | 1.08 | 1.08 | 1.95 |
| 65 | 1.00 | 0.81 | 0.57 | 0.65 | 1.90 |
| 80 | 1.00 | 1.08 | 0.45 | 0.53 | NA |
| 95 | 1.00 | NA | 0.37 | 0.25 | NA |

NA = Performance Level is Not Attainable

Figure 6:
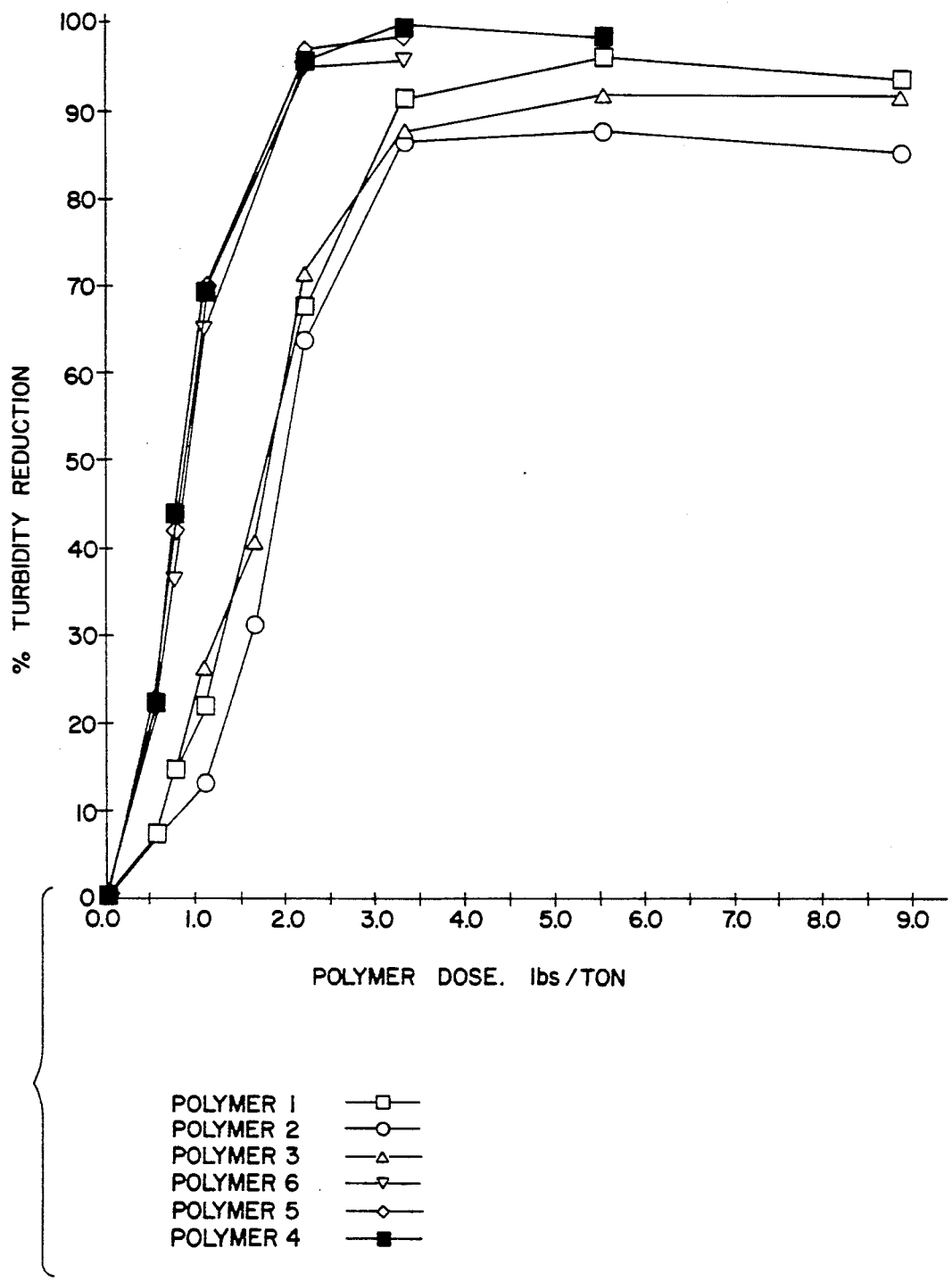
FIG. 6 is a graph comparing p-DADMAC and EPI/DMA polymer activities for filtrate turbidity reduction in T-broke #1 at varying levels of polymer dose.

Referring to FIG. 6, a comparison of p-DADMAC and EPI/DMA polymer activities for filtrate turbidity reduction in T-broke #1 is shown. T-broke #1 is from a state in the Eastern United States.

TABLE IV (Supplement to FIG. 6)

| Performance Level, % Turbidity Reduction | Replacement Ratios | | | | | |
|---|---|---|---|---|---|---|
| | Polymer 1 | Polymer 2 | Polymer 3 | Polymer 6 | Polymer 5 | Polymer 4 |
| 35 | 1.00 | 1.21 | 1.01 | 0.53 | 0.49 | 0.48 |
| 50 | 1.00 | 1.11 | 1.02 | 0.52 | 0.48 | 0.48 |
| 65 | 1.00 | 1.06 | 0.98 | 0.51 | 0.49 | 0.49 |
| 80 | 1.00 | 1.08 | 1.00 | 0.60 | 0.55 | 0.56 |

TABLE IV-continued reduction in T-broke #2 is shown. T-broke is from a state in the Eastern United States.

TABLE VI (Supplement to FIG. 8)
Replacement Ratios versus Polymer 1 for DADMAC, EPI/DMA, and DADMAC/AcAm Polymers for Filtrate Turbidity Reduction in T-Broke #2 (from a state in the eastern United States)

| Performance Level, % Turbidity Reduction | REPLACEMENT RATIOS | | | | | | | |
|---|---|---|---|---|---|---|---|---|
| | Polymer 1 | Polymer 2 | Polymer 3 | Polymer 6 | Polymer 5 | Polymer 4 | Polymer 8 | Polymer 7, Batch 1 |
| 35 | 1.00 | 1.18 | 1.01 | 0.58 | 0.53 | 0.48 | 0.51 | 0.28 |
| 50 | 1.00 | 1.06 | 0.88 | 0.54 | 0.48 | 0.46 | 0.49 | 0.29 |
| 65 | 1.00 | 1.06 | 0.88 | 0.56 | 0.52 | 0.49 | 0.50 | 0.37 |
| 80 | 1.00 | 1.34 | 0.79 | 0.69 | 0.53 | 0.50 | 0.49 | 0.41 |
| 90 | 1.00 | NA | 0.99 | NA | 0.59 | 0.45 | 0.42 | 0.43 |
| 95 | 1.00 | NA | 1.09 | NA | NA | 0.31 | 0.27 | — |

NA = Performance Level is Not Attainable (Supplement to FIG. 6)

| Performance Level, % Turbidity Reduction | Replacement Ratios | | | | | |
|---|---|---|---|---|---|---|
| | Polymer 1 | Polymer 2 | Polymer 3 | Polymer 6 | Polymer 5 | Polymer 4 |
| 95 | 1.00 | NA | NA | 0.45 | 0.43 | 0.44 |

NA = Performance Level is Not Attainable

Figure 7:
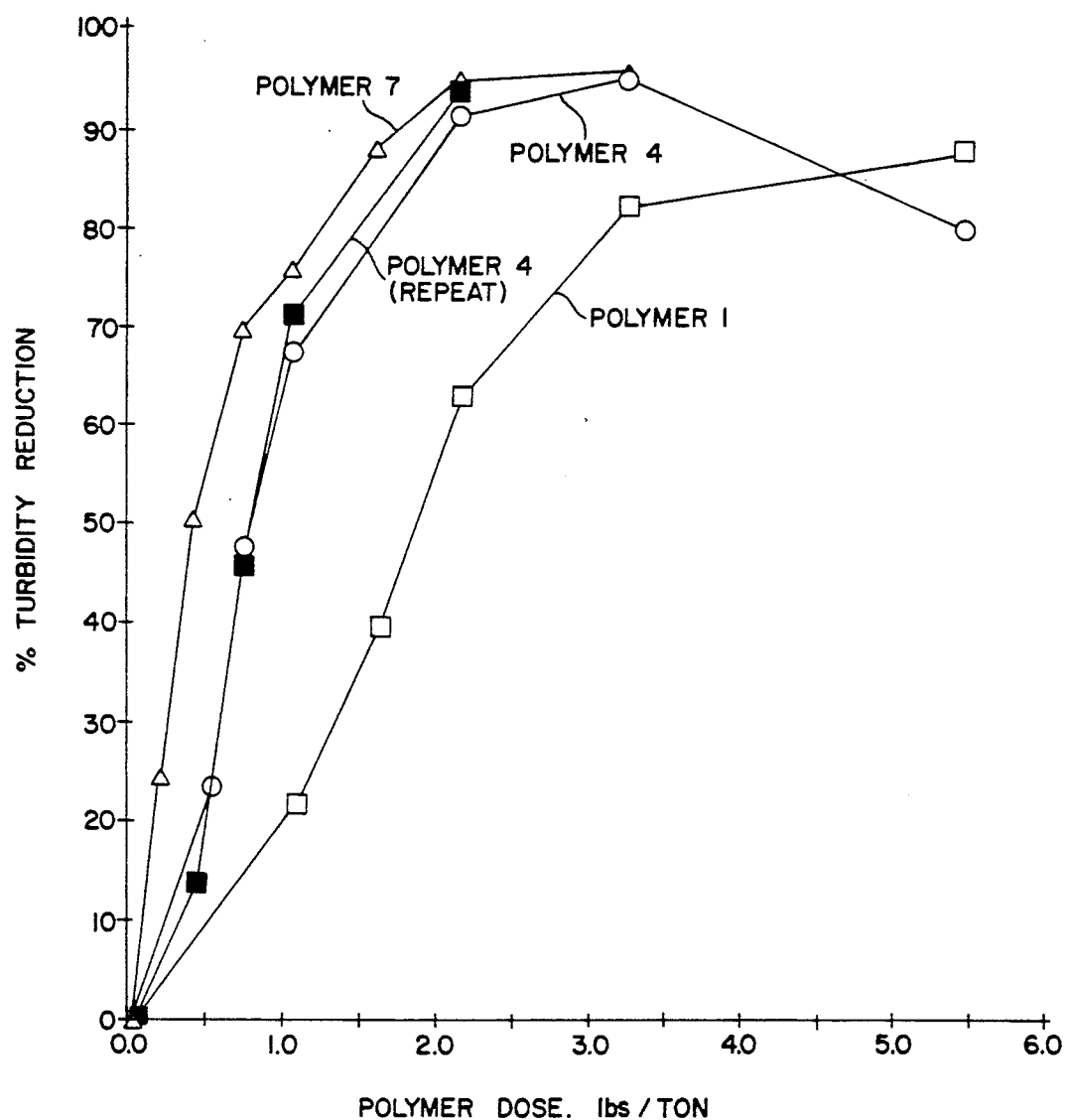
FIG. 7 is a graph comparing turbidity reduction of DADMAC/AcAm copolymer with turbidity reduction of EPI/DMA and p-DADMAC polymer for filtrate turbidity reduction in T-broke #1 at varying levels of polymer dose.

Referring to FIG. 7, a comparison of DADMAC-/AcAm copolymer activity with EPI/DMA and p-DADMAC polymer activities for filtrate turbidity reduction in T-broke #1 is shown. T-broke #1 is from a state in the Eastern United States.

TABLE V (Supplement to FIG. 7)

| Performance Level, % Turbidity Reduction | Replacement Ratios | | | |
|---|---|---|---|---|
| | Polymer 1 | Polymer 4, Run 1 | Polymer 7 | Polymer 4, Run 2 |
| 35 | 1.00 | 0.43 | 0.20 | 0.43 |
| 50 | 1.00 | 0.43 | 0.23 | 0.44 |
| 65 | 1.00 | 0.46 | 0.30 | 0.44 |
| 80 | 1.00 | 0.53 | 0.40 | 0.48 |
| 95 | NA | 1.00 | 0.67 | — |

NA = Performance Level is Not Attainable

Figure 8:
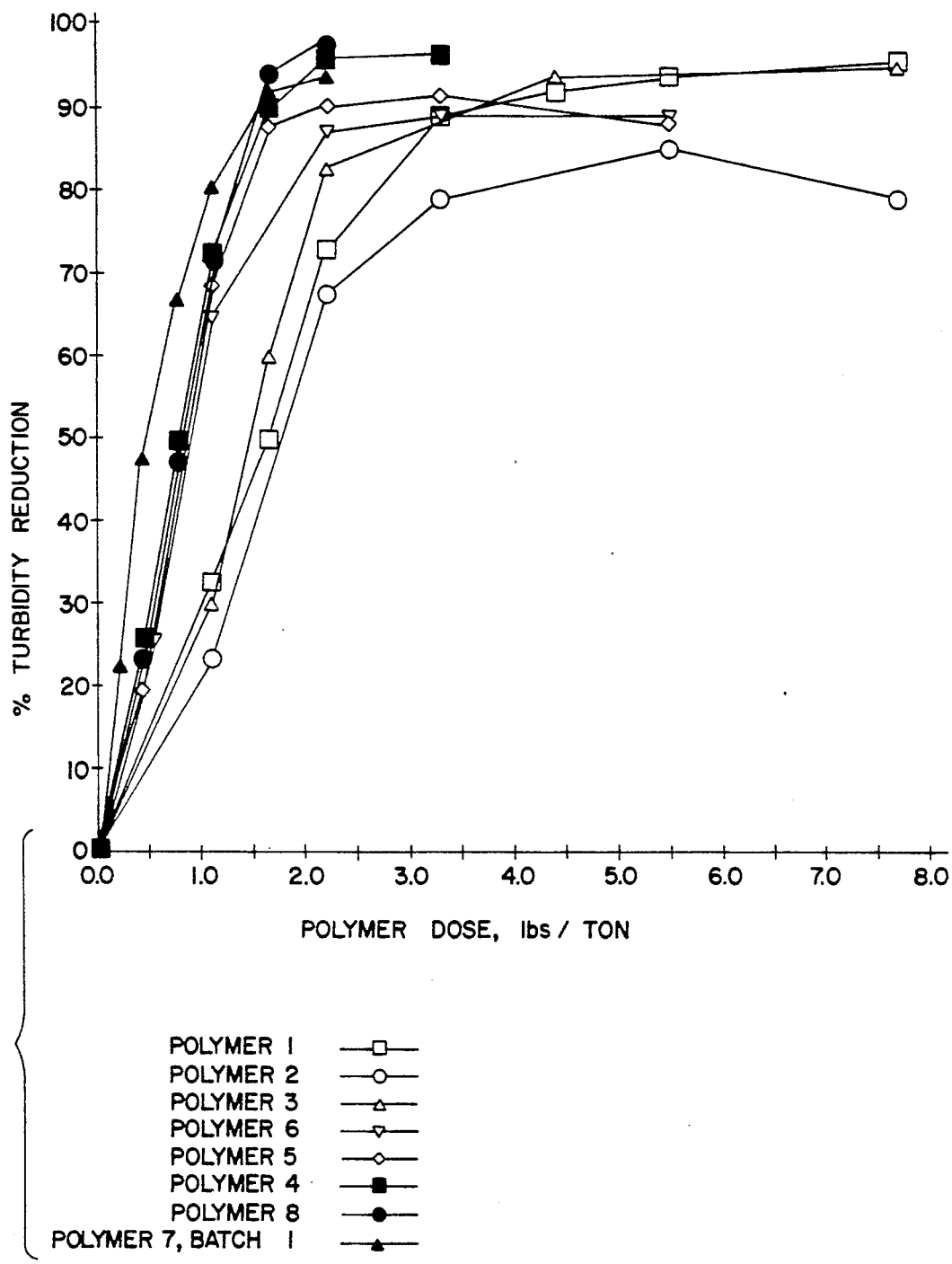
FIG. 8 is a graph comparing p-DADMAC and EPI/DMA polymer activities for filtrate turbidity reduction in T-broke #2 at varying levels of polymer dose.

Referring to FIG. 8, a comparison of p-DADMAC and EPI/DMA polymer activities for filtrate turbidity reduction in T-broke #2 is shown. T-broke #2 is from a state in the Eastern United States.

Figure 9:
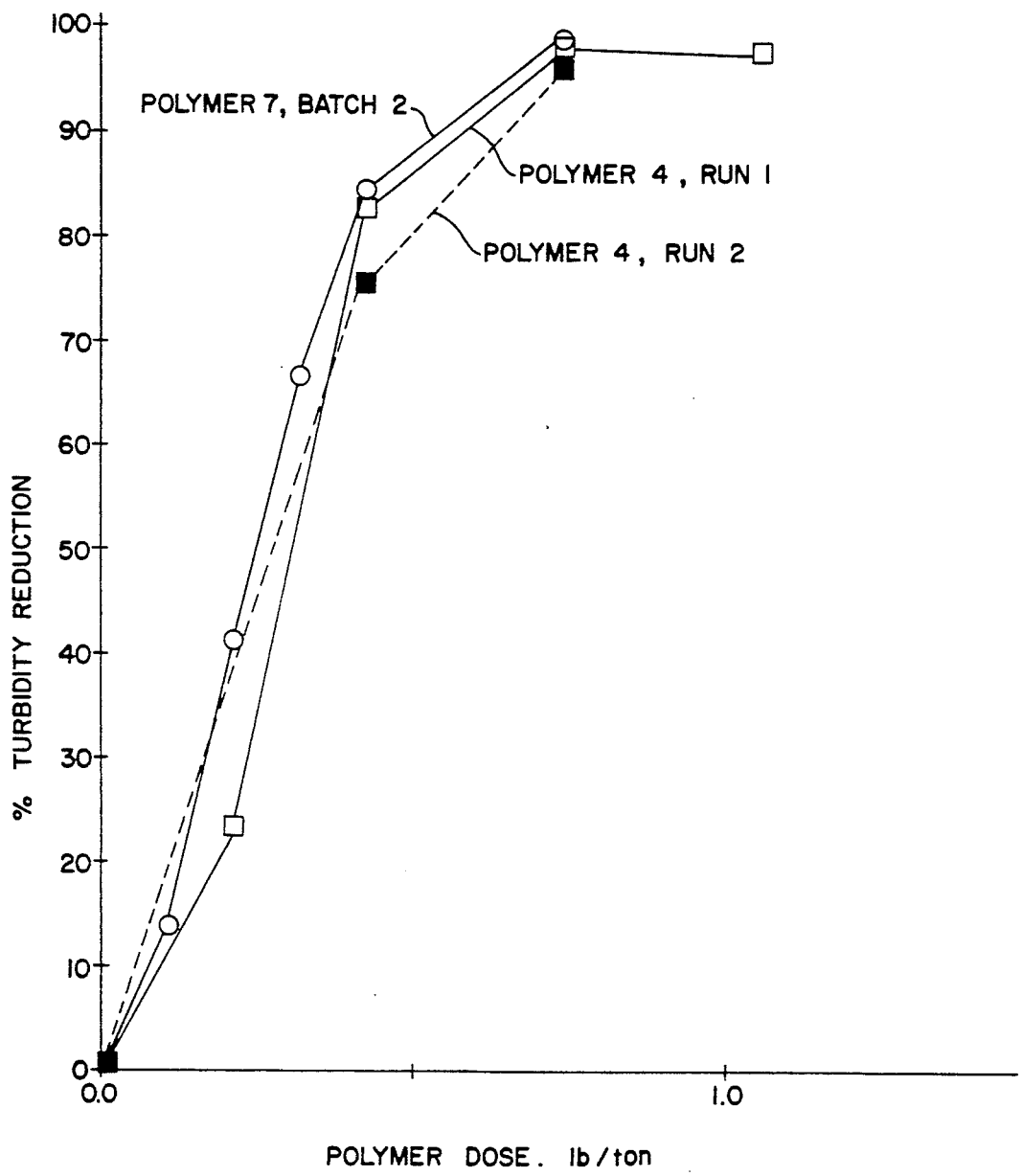
FIG. 9 is a graph comparing DADMAC/AcAm copolymer and p-DADMAC polymer activities for filtrate turbidity reduction in T-broke #4.

Referring to FIG. 9, a comparison of DADMAC-/AcAm copolymer and p-DADMAC polymer activities for filtrate turbidity reduction in T-broke #4 is shown. T-broke #4 is from a state in the Eastern United States.

TABLE VII (Supplement to FIG. 9)

| Performance Level, % Turbidity Reduction | Replacement Ratios | | |
|---|---|---|---|
| | Polymer 4, Run 1 | Polymer 7, Batch 2 | Polymer 4, Run 2 |
| 35 | 1.00 | 0.76 | 0.80 |
| 50 | 1.00 | 0.81 | 0.90 |
| 65 | 1.00 | 0.86 | 1.00 |
| 80 | 1.00 | 0.98 | 1.20 |
| 95 | 1.00 | 0.99 | 1.07 |

Figure 10:
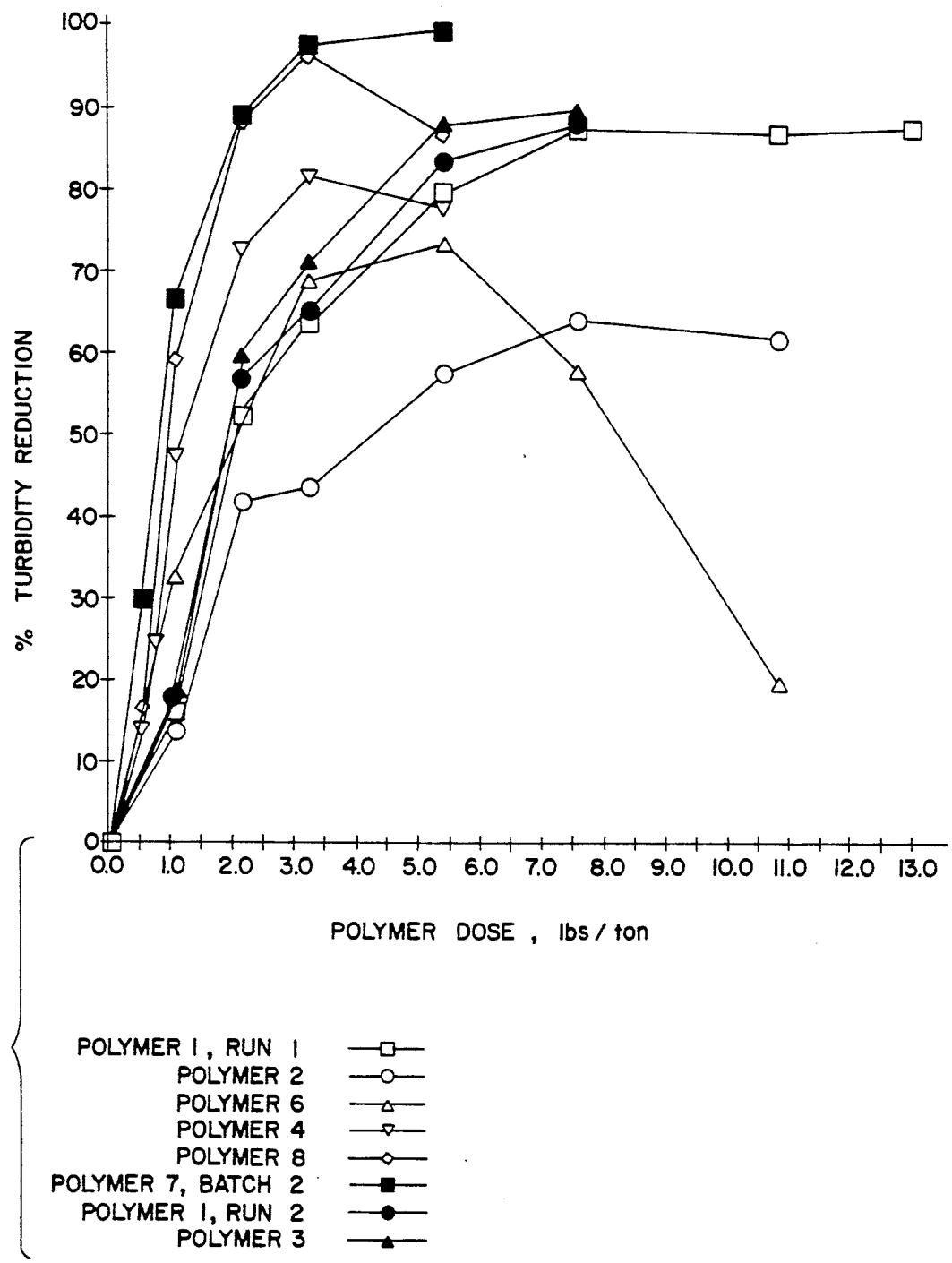
FIG. 10 is a graph comparing p-DADMAC, EPI/DMA, and DADMAC/AcAm polymer activities for filtrate turbidity reduction in P-broke #1.

Referring to FIG. 10, a comparison of p-DADMAC, EPI/DMA, and DADMAC/AcAm polymer activities for filtrate turbidity reduction in P-broke #1, Batch 1 is shown. P-broke #1 is from a state in the upper Midwest of the United States.

Figure 11:
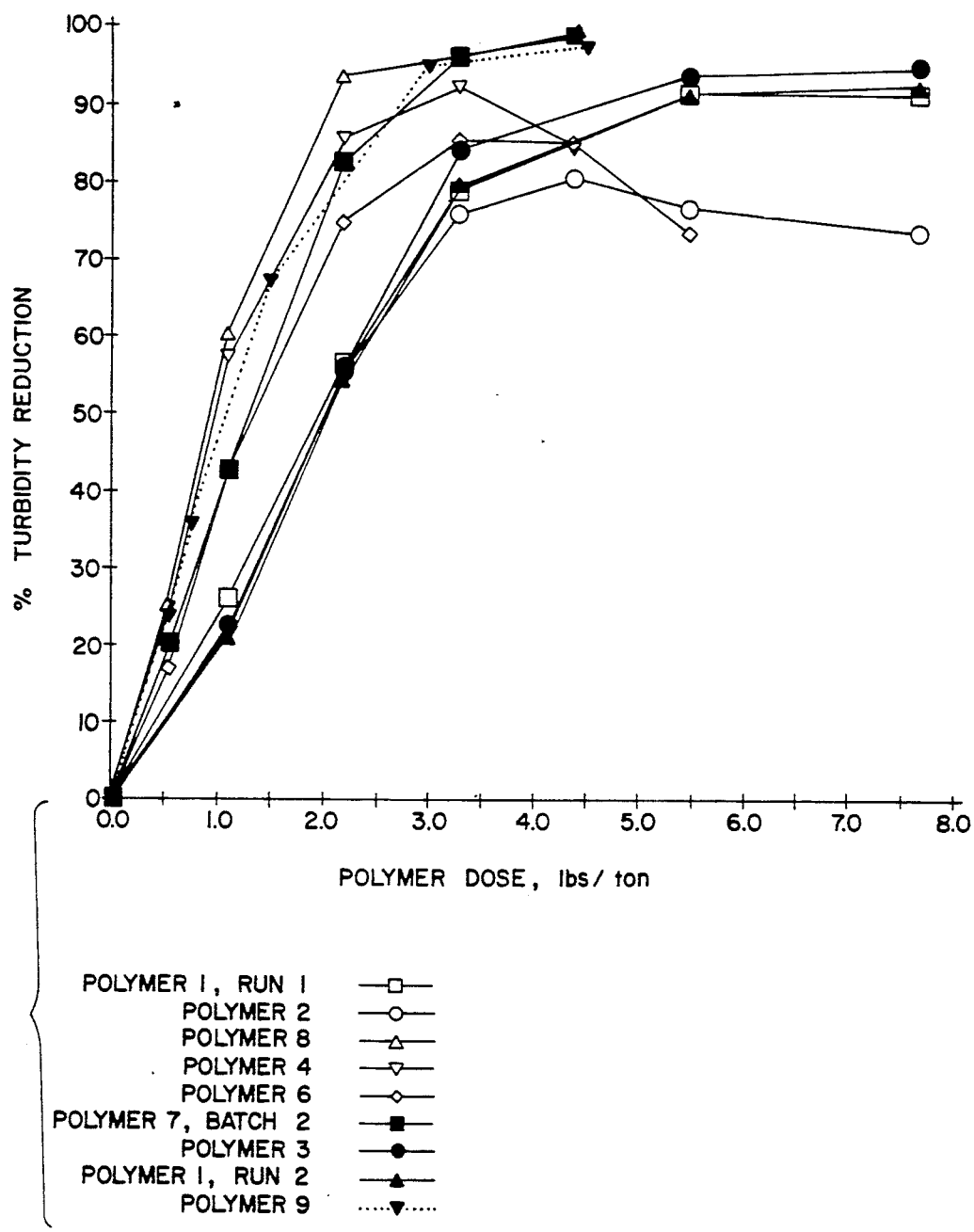
FIG. 11 is a graph comparing p-DADMAC, EPA/DMA, DADMAC/AcAm and DADMAC/AA polymer activities for filtrate turbidity reduction in C-broke #1.

Referring to FIG. 11, a comparison of p-DADMAC, EPI/DMA, DADMAC/AcAm, and DADMAC/AA polymer activities for filtrate turbidity reduction in C-broke #1 is shown. C-broke #1 is from a state in the Eastern United States.

TABLE VIII (Supplement to FIG. 10)
Replacement Ratios of p-DADMAC, DADMAC/AcAm Copolymers, and EPI/DMA Polymers from Filtrate Turbidity Data in P-Broke #1, Batch 1 (from a state in the upper Midwest of the United States)

| Performance Level, % Turbidity Reduction | REPLACEMENT RATIOS | | | | | | | |
|---|---|---|---|---|---|---|---|---|
| | Polymer 1 Run 1 | Polymer 2 | Polymer 6 | Polymer 4 | Polymer 8 | Polymer 7 Batch 2 | Polymer 1 Run 2 | Polymer 3 |
| 35 | 1.00 | 1.16 | 0.73 | 0.55 | 0.47 | 0.38 | 0.95 | 0.92 |
| 50 | 1.00 | 2.02 | 0.97 | 0.57 | 0.46 | 0.40 | 0.94 | 0.91 |
| 65 | 1.00 | NA | 0.86 | 0.53 | 0.37 | 0.31 | 0.93 | 0.77 |
| 80 | 1.00 | NA | NA | 0.56 | 0.33 | 0.31 | 0.91 | 0.79 |
| 35 | 1.06 | 1.22 | 0.77 | 0.58 | 0.50 | 0.40 | 1.00 | 0.97 |
| 50 | 1.06 | 2.15 | 1.03 | 0.61 | 0.49 | 0.42 | 1.00 | 0.96 |
| 65 | 1.07 | NA | 0.93 | 0.57 | 0.40 | 0.33 | 1.00 | 0.82 |
| 80 | 1.10 | NA | NA | 0.62 | 0.37 | 0.34 | 1.00 | 0.87 |
| 95 | NA | NA | NA | NA | 1.05 | 1.00 | NA | NA |

NA = Performance Level is Not Attainable

TABLE IX (Supplement to FIG. 11)
Replacement Ratios of p-DADMAC, DADMAC/AcAm Copolymers, and EPI/DMA Polymers from Filtrate Turbidity Data in P-Broke #1

| Performance Level, % Turbidity Reduction | Polymer 1 Run 1 | Polymer 2 | Polymer 8 | Polymer 4 | Polymer 6 | Polymer 7 Batch 2 | Polymer 3 | Polymer 1 Run 2 | Polymer 9 |
|---|---|---|---|---|---|---|---|---|---|
| 35 | 1.00 | 1.06 | 0.49 | 0.51 | 0.65 | 0.65 | 1.06 | 1.09 | 0.52 |
| 50 | 1.00 | 1.02 | 0.47 | 0.50 | 0.68 | 0.66 | 1.02 | 1.04 | 0.56 |
| 65 | 1.00 | 1.03 | 0.48 | 0.54 | 0.71 | 0.66 | 0.97 | 1.02 | 0.56 |
| 80 | 1.00 | 1.22 | 0.50 | 0.58 | 0.79 | 0.62 | 0.91 | 0.97 | 0.64 |
| 95 | NA | NA | 1.00 | NA | NA | 1.20 | 2.75 | NA | NA |

NA = Performance Level is Not Attainable

Viscosity data on test polymers is set forth below in Table X.

Test coagulant properties of the test polymers are set forth below in Table XI.

TABLE XI

Test Coagulant Properties

| Product | Chemistry | Wt % Polymer | IV (dl/g) | Polymer Charge[b] (meq/g) | Mol. Wt. Wt. Avg. from Mark-Houwink Determination |
|---|---|---|---|---|---|
| Polymer 1 | EPI/DMA NH$_3$ Crosslinked | 44.9 | 0.18 | 6.36/5.63[a] | na |
| Polymer 2 | EPI/DMA "Linear" | 51.5 | 0.10 | 7.24 | na |
| Polymer 3 | EPI/DMA HMDA[e] | 50.5 | 0.24 | 6.53/5.85[a] | na |
| Polymer 4 | p-DADMAC | 14.8 | 0.90 | 6.51 | 257,000 |
| Polymer 5 | p-DADMAC | 19.8 | 0.63 | 6.21 | 143,000 |
| Polymer 6 | p-DADMAC | 19.0 | 0.43 | 6.14 | 74,000 |
| Polymer 7 Batch 1 | DADMAC/AcAm Copolymer 40:60 wt. % DADMAC/AcAm | 19.3 | 4.63 | 2.47 | — |
| Polymer 7 Batch 2 | DADMAC/AcAm Copolymer 38:62 wt. % DADMAC/AcAm | 18.9 | 4.35 | 2.37 | — |
| Polymer 8 | p-DADMAC | 12.6 | 1.64 | — | — |
| Polymer 9 | DADMAC/AA[f]/ HPA[c] Terpolymer mole ratio, 87:10:3 | 20.0[d] | 1.08 | 5.57/4.92[a] | — |
| Polymer 10 | DADMAC/AcAm 91:9 wt. % | — | 3.00 | 5.65 | — |
| Polymer 11 | DADMAC/AcAm 85:15 wt. % | — | 4.00 | 5.29 | — |

[a]Two values given for acid (pH <4.5) and alkaline (pH >8.0) conditions, acid/alkaline.
[b]Theoretical charge values: DADMAC, 6.19 meq/g
EPI/DMA, 7.27 meq/g
DADMAC/AA/HPA, 5.65/5.00 meq/g
[c]HPA = hydroxypropylacrylate
[d]Nominal wt % polymer value
[e]HMDA = hexamethyldiamine
[f]AA = acrylic acid

TABLE X

Viscosity* Data on Test Polymers

| Product | Measured IV (dl/g) | Huggins Constant |
|---|---|---|
| Polymer 1 | 0.18 | 1.40 |
| Polymer 2 | 0.10 | 1.10 |
| Polymer 3 | 0.24 | 1.48 |
| Polymer 4 | 0.90 | 0.45 |
| Polymer 5 | 0.63 | 0.40 |
| Polymer 6 | 0.43 | 0.63 |
| Polymer 7, Batch 1 | 4.63 | 0.33 |
| Polymer 7, Batch 2 | 4.35 | 0.57 |
| Polymer 8 | 1.64 | 0.38 |
| Polymer 9 | 1.08 | 0.33 |

*as measured through a #75 Ubbelohde Capillary Tube in 1 Molar sodium nitrate at 30° C.

THE SUMMARY

The above data indicates that polymers containing diallyl dimethyl ammonium chloride and at least one of the monomers acrylamide, acrylic acid, hydroxypropyl acrylate, and the like, are effective and preferred polymeric treatments to disperse and coagulate white pitch, and its components, on cellulosic fibres obtained by re-pulping and recycling coated broke waste papers back to a paper machine. These polymers are superior to epichlorohydrin/dimethylamine polymers whether those EPI-DMA polymers be linear, crosslinked, or branched. The DADMAC polymers are superior not only in performance, but in cost performance and present the paper maker with alternatives which have not, to this date, existed. The diallyl dimethyl ammonium chloride polymers are preferably copolymers of DAD- MAC and acrylamide which copolymers contain a weight ratio of DADMAC to acrylamide ranging between about three to one (3:1) to about one 1 to three (1:3), preferably about two to one (2:1) to about one to two (1:2), and most preferably about a one to one (1:1) weight ratio copolymer (around 60:40 to 40:60). These DADMAC polymers can be used in normal conditions observed with recycling and re-pulping coated brokes in numerous paper manufacturing procedures. The use of the polymer is essentially pH independent and results of the use of these DADMAC polymers have not been anticipated by the use of other epichlorohydrin-dimethylamine based cationic polymers in paper manufacture.

In the above tables and figures, any reference to a replacement ratio refers to that fraction obtained when dividing a result for an experimental polymer with a result obtained from a standard polymer, normally a cross-linked EPI-DMA polymer, against which the test polymer is being compared. If the replacement ratio is equal to one, the experimental polymer is equal in performance, at whatever dimensionality is being measured, to the base or test polymer. If the replacement ratio is less than one, the test polymer is superior to the standard polymer, and if the replacement ratio is greater than one, the test polymer is inferior to the standard polymer.

Having described my invention, I claim:

1. In the process of manufacturing base paper sheet containing cellulose fibre derived from re-pulped coated broke containing white pitch, which process includes the steps of re-pulping said coated broke to form a re-pulped fibre slurry containing white pitch and then forming said base paper sheet from said re-pulped fibre slurry and other cellulose fibre sources, the improvement which comprises adding to said re-pulped fibre slurry a homopolymer of diallyl dimethyl ammonium chloride or a copolymer of diallyl dimethyl ammonium chloride, whereby white pitch in said re-pulped fibre slurry is deposited on fibres in the re-pulped slurry and then admixing the re-pulped fibre slurry with white pitch deposited on the re-pulped fibres with other cellulose fibre sources prior to forming said base paper sheet.

2. The method of claim 1 wherein the copolymer which is incorporated into the slurry contains at least 20 weight percent of diallyl dimethyl ammonium chloride.

3. The method of claim 2 wherein the copolymer of diallyl dimethyl ammonium chloride is a copolymer of diallyl dimethyl ammonium chloride and a vinylic monomer.

4. The method of claim 2 wherein the copolymer of diallyl dimethyl ammonium chloride is a copolymer of diallyl dimethyl ammonium chloride and acrylamide, methacrylamide, acrylic acid, methacrylic acid or hydroxypropyl acrylate.

5. The method of claim 4 wherein the copolymer of diallyl dimethyl ammonium chloride is a copolymer of diallyl dimethyl ammonium chloride and acrylamide.

6. The method of claim 5 wherein the weight ratio of diallyl dimethyl ammonium chloride to acrylamide in the copolymer is between about 3:1 and about 1:3.

7. The method of claim 5 wherein the weight ratio of diallyl dimethyl ammonium chloride to acrylamide in the copolymer is between about 2:1 and about 1:2.

8. The method of claim 5 wherein the weight ratio of diallyl dimethyl ammonium chloride to acrylamide in the copolymer is about 1:1.

9. The method of claim 2 wherein the copolymer of diallyl dimethyl ammonium chloride has a weight average molecular weight of from about 50,000 to 2,000,000.

10. The method of claim 3 wherein the copolymer of diallyl dimethyl ammonium chloride has a weight average molecular weight of from about 50,000 to 2,000,000.

11. The method of claim 4 wherein the copolymer of diallyl dimethyl ammonium chloride has a weight average molecular weight of from about 50,000 to 2,000,000.

12. The method of claim 5 wherein the copolymer of diallyl dimethyl ammonium chloride has a weight average molecular weight of from about 50,000 to 2,000,000.

13. The method of claim 6 wherein the copolymer of diallyl dimethyl ammonium chloride has a weight average molecular weight of from about 50,000 to 2,000,000.

14. The method of claim 7 wherein the copolymer of diallyl dimethyl ammonium chloride has a weight average molecular weight of from about 50,000 to 2,000,000.

15. The method of claim 8 wherein the copolymer of diallyl dimethyl ammonium chloride has a weight average molecular weight of from about 50,000 to 2,000,000.

* * * * *